United States Patent [19]

Kawashima et al.

[11] Patent Number: 5,294,669
[45] Date of Patent: Mar. 15, 1994

[54] URETHANE ELASTOMER BASED THERMOPLASTIC RESIN COMPOSITION SUITABLE FOR EXTRUSION

[75] Inventors: Chikashi Kawashima, Tokyo; Sunao Koga, Kamifukuoka; Katunori Kawamura, Kawagoe, all of Japan

[73] Assignee: Central Glass Company, Limited, Ube, Japan

[21] Appl. No.: 901,146

[22] Filed: Jun. 19, 1992

[30] Foreign Application Priority Data

Jun. 24, 1991 [JP] Japan .................. 3-151761

[51] Int. Cl.$^5$ .................... C08L 27/16; C08L 75/04
[52] U.S. Cl. .................... 525/129; 525/127; 525/72; 525/276
[58] Field of Search ..................... 525/129

[56] References Cited

U.S. PATENT DOCUMENTS 3,984,493 10/1976 Kazama et al. .................. 260/859
4,710,413 12/1987 Quack .................. 428/36

FOREIGN PATENT DOCUMENTS 2052681 of 0000 Fed. Rep. of Germany .
2187467 of 0000 United Kingdom .

*Primary Examiner*—James J. Seidleck
*Assistant Examiner*—Mary Critharis
*Attorney, Agent, or Firm*—Keck, Mahin & Cate

[57] ABSTRACT

A thermoplastic resin composition, which is flexible and can easily be extruded, is obtained by blending (A) 100 parts by weight of a thermoplastic urethane elastomer with (B) 1–100 parts by weight of a thermoplastic graft copolymer obtained by graft polymerization of vinylidene fluoride with an elastomeric copolymer of at least two principal monomers including at least one fluorine-containing compound, e.g. vinylidene fluoride and chlorotrifluoroethylene, and an unsaturated peroxy compound. Compared with the urethane elastomer (A) itself, this resin composition is better in extrudability, lower in kinetic friction coefficient, weaker in surface tackiness of molded products and higher in resistance to heat aging.

7 Claims, No Drawings

URETHANE ELASTOMER BASED THERMOPLASTIC RESIN COMPOSITION SUITABLE FOR EXTRUSION

BACKGROUND OF THE INVENTION

This invention relates to a thermoplastic resin composition which is a blend of a thermoplastic urethane elastomer and a specifically selected thermoplastic fluororesin having flexibility. The resin composition is particularly suitable for extrusion to form, for example, tubes or coverings of electric wires or cables.

Urethane elastomers are widely used as thermoplastic resins having excellent mechanical properties. In particular urethane elastomers having a glass transition temperature lower than room temperature are largely used as extrusion molding materials to form various tubes and coverings of electric wires and cables.

However, from some aspects thermoplastic urethane elastomers have disadvantages too. First, compared with more popular thermoplastic resins such as polyvinyl chloride resins conventional urethane elastomers are generally inferior in extrudability and hence offer greater load to extruders. Therefore, when an urethane elastomer is extruded with an extruder primarily designed for extrusion of other thermoplastic resins it is likely that the extrusion output per unit time and some other items of extrusion conditions are unstable by reason of insufficient power of the extruder.

Thermoplastic urethane elastomers relatively low in hardness have another disadvantage that the extrusion molded products have considerably tacky surfaces. When the products such as tubes or covered wires are left stacked at room temperature the products stick to each other, and in some cases the struck products cannot easily be separated from one another. In industrial practice it is often to apply an antisticking agent in the form of powder or paste to the extruded products of urethane elastomer, but the application of such a powder or paste is troublesome and in many cases raises the need of removing the antisticking agent at the stage of using the extruded products. In some cases the tacky products tend to stick to articles made of different materials and consequently raise certain problems. For example, when a cable having an urethane elastomer covering is used in an industrial robot there is a possibility that the cable sticks to a rack or another cable covered with a different material and consequently breaks as the robot repeats preprogrammed operations.

Besides, as covering materials for electric wires and cables conventional thermoplastic urethane elastomers are not fully satisfactory in resistance to heat aging and in this respect are inferior to conventional fluororesins.

SUMMARY OF THE INVENTION

It is an object of the present invention to obviate the above explained disadvantages of thermoplastic urethane elastomers, without sacrificing the flexibility inherent to the elastomers, by blending a conventional thermoplastic urethane elastomer with a specifically selected thermoplastic fluororesin which possesses flexibility.

According to the invention the above object is accomplished by blending 100 parts by weight of a thermoplastic urethane elastomer with 1-100 parts by weight of a thermoplastic and fluorine-containing graft copolymer which is obtained by graft polymerization of vinylidene fluoride with an elastomeric copolymer of at least two principal monomers including at least one fluorine-containing monomer and a subsidiary monomer which has at least one double bond and peroxy group, the elastomeric copolymer having a glass transition temperature below room temperature.

In this invention it is preferred to use an urethane elastomer having a glass transition temperature below room temperature.

The thermoplastic and fluorine-containing graft copolymer used in this invention belongs to a group of fluorine-containing graft copolymers disclosed in U.S. Pat. No. 4,472,557. In the graft copolymer the "trunk" polymer is a fluorine-containing elastomeric copolymer, and the "branch" segments are of crystalline polyvinylidene fluoride. The graft polymerization of vinylidene fluoride is accomplished by using thermal decomposition of the peroxy groups in the trunk polymer. In this invention it is preferred that the weight ratio of the graft polymerized vinylidene fluoride to the trunk polymer is in the range from 20:100 to 80:100. This graft copolymer itself serves as a soft and flexible fluororesin which can easily be molded by extrusion and other conventional resin molding methods. The graft copolymer can be well melted at temperatures suitable for molding conventional thermoplastic urethane elastomers. For example, the graft copolymer has a melting temperature of about 170° C.

In the graft copolymer a preferred example of the trunk polymer, viz. elastomeric copolymer having peroxy groups, is a copolymer of vinylidene fluoride, chlorotrifluoroethylene and a relatively small amount of an unsaturated peroxy compound such as t-butyl peroxyallylcarbonate.

The thermoplastic resin compositions according to the invention are soft and flexible fluororesins and serve as improved substitutes for conventional thermoplastic urethane elastomers. Each of the blended resin compositions of the invention is better in extrudability than the urethane elastomer used in that composition. That is, when the blended resin composition is melted and kneaded in the cylinder of an extruder the torque generated by the motion of the screw is smaller than the torque generated in the case of kneading the urethane elastomer itself. Furthermore, compared with the urethane elastomer the blended resin composition is lower in the coefficient of kinetic friction of a molded product with either the same material or a different material and weaker in surface tackiness of molded products. Besides, by virtue of incorporating a fluororesin the blended resin composition is considerably improved in resistance to heat aging and in some cases possesses improved flame retardency.

DESCRIPTION OF THE PREFERRED EMBODIMENTS

Thermoplastic urethane elastomers are classified into several types according to the types of the employed polyol, such as caprolactones, adipates, ethers and carbonates. In this invention it is possible to use a conventional thermoplastic urethane elastomer of any type, and preferably one having a glass transition temperature below room temperature.

As to the fluorine-containing graft copolymer the principal monomers for the elastomeric copolymer, which is the trunk polymer, can be selected from various combinations. It is preferable to employ a combination of two or three fluorine-containing compounds, but it is also possible to use a combination of at least one fluorine-containing compound and at least one unsubstituted hydrocarbon such as, for example, propylene and/or ethylene. More particularly it is preferred to employ a combination of vinylidene fluoride (VDF) and chlorotrifluoroethylene (CTFE), combination of VDF and hexafluoropropene (HFP), combination of VDF, HFP and tetrafluoroethylene (TFE). As to the subsidiary monomer having at least one double bond and peroxy group, examples of useful compounds are unsaturated peroxyesters such as t-butyl peroxymethacrylate and t-butyl peroxycrotonate and unsaturated peroxycarbonates such as t-butyl peroxyallylcarbonate and p-menthane peroxyallylcarbonate. It suffices to mix a relatively small amount of such an unsaturated peroxide with the above described principal monomers. That is, in general it suffices that the unsaturated peroxide monomer amounts to about 0.05 to 5 wt % of the monomer mixture to be copolymerized.

The branch polymer of the fluorine-containing graft copolymer is always polyvinylidene fluoride. It is preferable to graft polymerize 20–80 parts by weight of VDF with 100 parts by weight of the above described fluorine-containing elastomeric copolymer. When the amount of the graft polymerized VDF is less than 20 parts by weight the graft copolymer in melted state has a relatively high viscosity, and hence it is not easy to accomplish good blending of the graft copolymer with a thermoplastic urethane elastomer by melt blending. When the amount of the graft polymerized VDF is more than 80 parts by weight it is likely that both the graft copolymer and a blend of the graft copolymer with a thermoplastic urethane elastomer are insufficient in softness or flexibility.

A resin composition according to the invention is obtained by blending 100 parts by weight of a thermoplastic urethane elastomer with 1 to 100 parts by weight of the above described graft copolymer. If the amount of the graft copolymer is less than 1 part by weight the effects of the blending are insufficient. If the amount of the graft copolymer is more than 100 parts by weight the blended resin composition becomes too different from the urethane elastomer because in the blended resin composition the urethane elastomer is dispersed in a continuous phase of the graft copolymer. It is preferred to blend 5 to 80 parts by weight of the graft copolymer with 100 parts by weight of an urethane elastomer.

Usually the blending is accomplished by a melt blending method using, for example, a twin-roll kneader or an extruder. However, if desired it is possible to accomplish blending by dissolving both the urethane elastomer and the graft copolymer in a polar solvent such as dimethylformamide.

The following nonlimitative examples are illustrative of the invention.

EXAMPLE 1

1. Preparation of Fluorine-containing Graft Copolymer

Initially a 100-liter stainless steel autoclave was charged with 50 kg of purified water, 100 g of potassium persulfate, 150 g of ammonium perfluorooctanoate and 100 g of t-butyl peroxyallylcarbonate (abbreviated to BPAC). The gas atmosphere in the autoclave was repeatedly replaced by nitrogen gas, and then the gas was purged. After that 12.5 kg of VDF monomer and 7.55 kg of CTFE monomer were introduced into the autoclave, and the resultant mixture was subjected to copolymerization reaction at a temperature of 50° C. for 20 h while continuing stirring. The reaction product was in the state of white latex. From this latex a rubber-like powder was obtained by salting-out treatment. The powder was washed with water, dried in vacuum, then washed with n-hexane to completely remove unreacted residue of BPAC and again dried in vacuum. The dried powder weighed 16 kg. This powder was of an elastomeric copolymer of VDF, CTFE and BPAC. Thermal analysis of this copolymer with a differential scanning calorimeter (DSC) revealed the existence of an exothermic peak at 160°–180° C., which was attributed to decomposition of peroxy group. By DSC analysis the glass transition temperature of the copolymer was about −21° C. By iodometric titration the content of active oxygen in the copolymer was measured to be 0.042%.

To carry out a graft polymerization reaction, 12 kg of the above copolymer powder was charged in a 100-liter stainless steel autoclave together with 75 kg of 1,1,2-trifluoro-1,2,2-trichloroethane (solvent). The gas atmosphere in the autoclave was repeatedly replaced by nitrogen gas, and then the gas was purged. After that 6 kg of VDF monomer was charged into the autoclave, and the resultant mixture was subjected to polymerization reaction at 95° C. for 24 h with continuous stirring. The reaction product was separated from the solvent and dried to obtain 16.6 kg of a graft copolymer in the form of a white powder. By calculation from the weight of the obtained graft copolymer, the weight ratio of the graft polymerized VDF to the elastomeric trunk copolymer was 38.3:100.

The obtained graft copolymer was pelletized with an extruder having a diameter of 30 mm (length-to-diameter ratio of the cylinder was 22) at a temperature of 180°–200° C.

2. Blending of Graft Copolymer and Urethane Elastomer

As a conventional thermoplastic urethane elastomer, MIRACTRAN P22M of Nippon MIRACTRAN Co. was employed. The urethane elastomer in the form of pellets was dried at 80° C. for 4 hr.

In a drum type tumbler 100 parts by weight of the urethane elastomer was mixed with 5 parts by weight of the fluroine-containing graft copolymer prepared and pelletized by the above described process. The resultant mixture was melted and kneaded by using the aforementioned extruder to thereby accomplish blending of the urethane elastomer with the fluorine-containing graft copolymer and obtain the blended resin composition in the form of pellets.

EXAMPLES 2–4

In these examples the thermoplastic uerthane elastomer used in Example 1 was blended with the fluorine-containing graft copolymer prepared in Example 1 at different ratios. That is, in Examples 2, 3 and 4 the blending ratio of the graft copolymer to the urethane elastomer was 20:100, 50:100 and 80:100 by weight, respectively.

COMPARATIVE EXAMPLE

In this case, 120 parts by weight of the graft copolymer prepared in Example 1 was blended with 100 parts by weight of the thermoplastic urethane elastomer used in the foregoing examples.

EVALUATION TESTS

The blended resin compositions of Examples 1–4 and Comparative Example were each subjected to the following tests.

The results of the tests are shown in the Table at the end of the description.

(1) Torque generated in kneading melted resin

The testing apparatus was a laboratory mixer for plastics in which the capacity of the mixing chamber was 60 ml. The mixer was kept heated at 200° C., and a given quantity of the blended resin composition in the form of pellets was filled into the mixing chamber provided with a rotor. The quantity of the blended resin composition was determined by the following equation, wherein "resin" refers to the blended resin composition and S.G. stands for specific gravity.

$$\text{Qty. of resin (g)} = 60 \times \frac{S.G. \text{ of resin}}{1.2 \ (S.G. \text{ of urethane elastomer})}$$

The mixer was left at rest for 1 min to allow the resin composition to melt. Then the rotor was revolved at a rate of 40 rpm, and the maximum value of torque generated by the revolution was measured.

(2) Kinetic coefficient of friction

The blended resin composition in the form of pellets was molded into 150 mm square sheets having a thickness of 2 mm by compression molding at a temperature of 200° C. Care was taken to obtain resin sheets having smooth surfaces. The resin sheets were used as specimens in the following tests (a) and (b).

(a) Friction with the same resin

Kinetic coefficient of friction between two sheets of the resin composition was measured by the test method according to ASTM D 1894 at a temperature of 23° C. The sled load was 200 g, and the sliding speed was 150 mm/min.

(b) Friction with carbon steel

Kinetic coefficient of friction between a sheet of the resin composition and a plate of a carbon steel (S45C) was measured with a friction abrasion tester (EFM-III-EN of Orientech Co.). The load was 5 kgf/cm$^2$, and the sliding speed was 0.2 m/sec.

(3) Tensile strength

The blended resin composition in the form of pellets was melted and kneaded in a twin-roll mixer which was operated at a temperature of 170° C. for 30 min. Then the melted resin composition was formed into a sheet having a thickness of 1 mm by compression molding, wherein a pressure of 60 kgf/cm$^2$ was applied for 2 min at a temperature of 200° C. This resin sheet was punched to form dumb-bell specimens No. 3 according to JIS K 6301. Using these specimens, tensile strength and elongation at break were measured at 23° C. with an Instron type tensile tester. The pulling speed was 200 mm/min.

(4) Hardness

Using the resin sheet molded to form the aforementioned dumb-bell specimens, the durometer hardness A of the resin composition was measured by the test method according to JIS K 7215.

(5) Heat aging

The dumb-bell specimens formed for the tensile test were kept heated at 150° C. in a gear oven for 168 h. After that the specimens were subjected to the above described tensile test at 23° C. to measure the tensile strength and elongation at break, and the measurements were compared with the measurements in the tensile test (3) to indicate the resistance to heat aging by the percentages of the retained tensile strength and elongation.

REFERENCES 1 AND 2

The above described tests were made also on the thermoplastic urethane elastomer used in the foregoing examples (Reference 1) and the fluorine-containing graft copolymer prepared in Example 1 (Reference 2). The results are included in the following Table.

|  | Ex. 1 | Ex. 2 | Ex. 3 | Ex. 4 | Comp. Ex. | Ref. 1 | Ref. 2 |
|---|---|---|---|---|---|---|---|
| Composition (parts by weight) | | | | | | | |
| Urethane elastomer | 100 | 100 | 100 | 100 | 100 | 100 | — |
| Graft copolymer | 5 | 20 | 50 | 80 | 120 | — | 100 |
| Properties of Resin | | | | | | | |
| Specific gravity | 1.22 | 1.28 | 1.35 | 1.41 | 1.46 | 1.20 | 1.78 |
| Melt torque, max. (kg · m) | 7.95 | 7.72 | 7.34 | 6.65 | 6.42 | 8.10 | 5.60 |
| Coefficient of friction with same resin | 5.08 | 4.73 | 2.32 | 1.26 | 1.08 | 5.26 | 0.63 |
| Coefficient of friction with carbon steel | 3.4 | 3.4 | 3.3 | 2.9 | 2.5 | 3.5 | 1.3 |
| Tensile strength (kgf/cm$^2$) | 551 | 505 | 495 | 476 | 435 | 555 | 316 |
| Elongation (%) | 560 | 550 | 542 | 522 | 515 | 569 | 480 |
| Hardness | 80 | 81 | 83 | 85 | 88 | 79 | 93 |
| Heat Aging | | | | | | | |
| Retained tensile strength (%) | 64 | 72 | 77 | 78 | 83 | 51 | 104 |
| Retained elongation (%) | 89 | 92 | 90 | 90 | 95 | 91 | 102 |

What is claimed is:

1. A thermoplastic resin composition having improved extrudability compared with thermoplastic urethane elastomer, comprising a blend of (A) 100 parts by weight of a thermoplastic urethane elastomer and (B) 1-100 parts by weight of a thermoplastic fluorine-containing graft copolymer which is obtained by graft polymerization of vinylidene fluoride with an elastomeric copolymer of at least two principal monomers including at least one fluorine-containing monomer and a subsidiary monomer which has at least one double bond and peroxy group, said elastomeric copolymer having a glass transition temperature below room temperature.

2. A resin composition according to claim 1, wherein said urethane elastomer has a glass transition temperature below room temperature.

3. A resin composition according to claim 1, wherein the weight ratio of said vinylidene fluoride to said elastomeric copolymer is in the range from 20:100 to 80:100.

4. A resin composition according to claim 1, wherein the amount of said graft copolymer (B) is 5-80 parts by weight.

5. A resin composition according to claim 1, wherein said at least one fluorine-containing monomer is selected from the group consisting of vinylidene fluoride, tetrafluoroethylene, chlorotrifluoroethylene and hexafluoropropene.

6. A resin composition according to claim 5, wherein said at least two principal monomers consist of vinylidene fluoride and chlorotrifluoroethylene.

7. A resin composition according to claim 5, wherein said subsidiary monomer is selected from the group consisting of t-butyl peroxymethacrylate, t-butyl peroxycrotonate, t-butyl peroxyallylcarbonate and p-methane peroxyallylcarbonate.

* * * * *